(12) United States Patent
Allington et al.

(10) Patent No.: US 12,009,721 B2
(45) Date of Patent: Jun. 11, 2024

(54) EDDY CURRENT BRAKE CONFIGURATIONS

(71) Applicant: Eddy Current Limited Partnership, Wellington (NZ)

(72) Inventors: Christopher James Allington, Leeston (NZ); Andrew Karl Diehl, Wellington (NZ); Kevin A. Wright, Wellington (NZ); Weston Hill, Wellington (NZ); Dave Walters, Wellington (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 0 days.

(21) Appl. No.: 17/393,791

(22) Filed: Aug. 4, 2021

(65) Prior Publication Data

US 2021/0367498 A1 Nov. 25, 2021

Related U.S. Application Data

(63) Continuation of application No. 15/532,975, filed as application No. PCT/NZ2015/050208 on Dec. 4, 2015, now Pat. No. 11,114,930.

(30) Foreign Application Priority Data

Dec. 4, 2014 (NZ) ........................................ 701550

(51) Int. Cl.
*H02K 49/04* (2006.01)
*A62B 1/08* (2006.01)
(Continued)

(52) U.S. Cl.
CPC ............ *H02K 49/046* (2013.01); *A62B 1/08* (2013.01); *B60L 7/28* (2013.01); *F16D 59/02* (2013.01);
(Continued)

(58) Field of Classification Search
CPC .... H02K 49/043; H02K 49/106; H02K 49/04; H02K 49/046; H02K 7/116; H02K 7/12;
(Continued)

(56) References Cited

U.S. PATENT DOCUMENTS 557,099 A * 3/1896 Badt .................... H05K 1/0231
388/822
2,058,024 A 10/1936 Logan, Jr.
(Continued)

FOREIGN PATENT DOCUMENTS

CN 1783674 A 6/2006
CN 101820952 A 9/2010
(Continued)

OTHER PUBLICATIONS

Extended European Search Report, dated Jul. 11, 2017, for European Application No. 14872681.3-1809, 10 pages.
(Continued)

*Primary Examiner* — Nicholas J Lane
*Assistant Examiner* — Stephen M Bowes
(74) *Attorney, Agent, or Firm* — Seed IP Law Group LLP

(57) ABSTRACT

Described herein are eddy current brakes and associated methods of their use, particularly configurations that have a kinematic relationship with at least two rotational degrees of freedom used to tune operation of the brake or apparatus in which the brake is located.

12 Claims, 3 Drawing Sheets

(51) Int. Cl.
<table>
<tr><td>B60L 7/28</td><td>(2006.01)</td></tr>
<tr><td>F16D 59/02</td><td>(2006.01)</td></tr>
<tr><td>F16F 15/03</td><td>(2006.01)</td></tr>
<tr><td>H02K 7/116</td><td>(2006.01)</td></tr>
<tr><td>H02K 7/12</td><td>(2006.01)</td></tr>
<tr><td>A63B 69/00</td><td>(2006.01)</td></tr>
<tr><td>F16D 121/20</td><td>(2012.01)</td></tr>
</table>

(52) U.S. Cl.
CPC ............... *H02K 7/116* (2013.01); *H02K 7/12* (2013.01); *A63B 69/0048* (2013.01); *F16D 2121/20* (2013.01); *Y02T 10/64* (2013.01)

(58) Field of Classification Search
CPC ....... F16F 15/035; F16F 15/03; F16D 63/002; F16D 59/00; A62B 1/08; A62B 1/10; A63B 69/0048; B04B 17/30; G04B 17/30
USPC ............................................ 310/92, 93, 105
See application file for complete search history.

(56) References Cited

U.S. PATENT DOCUMENTS

| | | |
|---|---|---|
| 2,122,312 A | 6/1938 | Cassion |
| 2,122,315 A | 6/1938 | Fosty et al. |
| 2,272,509 A | 2/1942 | Cavallo |
| 2,409,009 A | 10/1946 | Bakke |
| 2,428,104 A | 9/1947 | Winther |
| 2,436,072 A * | 2/1948 | Matulaitis ............ H02K 49/043 310/105 |
| 2,437,871 A | 3/1948 | Wood |
| 2,492,776 A | 12/1949 | Winther |
| 2,578,419 A | 12/1951 | Gittings |
| 2,586,577 A * | 2/1952 | Stivin ................... G01R 11/32 361/170 |
| 2,771,171 A | 11/1956 | Schultz |
| 2,807,734 A | 9/1957 | Lehde |
| 3,364,795 A | 1/1968 | De Coye De Castelet |
| 3,447,006 A | 5/1969 | Bair |
| 3,721,394 A | 3/1973 | Reiser |
| 3,868,005 A | 2/1975 | McMillan |
| 3,934,446 A | 1/1976 | Avitzur |
| 3,962,595 A | 6/1976 | Eddens |
| 3,967,794 A | 7/1976 | Fohl |
| 4,078,719 A | 3/1978 | Durland et al. |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,544,111 A | 10/1985 | Nakajima |
| 4,561,605 A | 12/1985 | Nakajima |
| 4,567,963 A * | 2/1986 | Sugimoto ................ B66D 5/02 182/236 |
| 4,600,849 A | 7/1986 | Lawson et al. |
| 4,612,469 A | 9/1986 | Muramatsu |
| 4,676,452 A | 6/1987 | Nakajima |
| 4,690,066 A | 9/1987 | Morishita et al. |
| 4,846,313 A | 7/1989 | Sharp |
| 4,938,435 A | 7/1990 | Varner et al. |
| 4,957,644 A | 9/1990 | Price et al. |
| 4,974,706 A | 12/1990 | Maji et al. |
| 5,054,587 A | 10/1991 | Matsui et al. |
| 5,064,029 A | 11/1991 | Araki et al. |
| 5,084,640 A | 1/1992 | Morris et al. |
| 5,205,386 A | 4/1993 | Goodman et al. |
| 5,248,133 A | 9/1993 | Okamoto et al. |
| 5,272,938 A | 12/1993 | Hsu et al. |
| 5,342,000 A | 8/1994 | Berges et al. |
| 5,392,881 A | 2/1995 | Cho et al. |
| 5,441,137 A | 8/1995 | Organek et al. |
| 5,465,815 A | 11/1995 | Ikegami |
| 5,477,093 A | 12/1995 | Lamb |
| 5,483,849 A * | 1/1996 | Orii ..................... B64D 11/003 188/185 |
| 5,495,131 A | 2/1996 | Goldie et al. |
| 5,636,804 A | 6/1997 | Jeung |
| 5,691,587 A * | 11/1997 | Lamb .................... H02K 49/046 310/75 D |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion et al. |
| 5,779,178 A | 7/1998 | McCarty |
| 5,791,584 A | 8/1998 | Kuroiwa |
| 5,822,874 A | 10/1998 | Nemes |
| 5,862,891 A | 1/1999 | Kröger et al. |
| 5,928,300 A | 7/1999 | Rogers et al. |
| 6,041,897 A | 3/2000 | Saumweber et al. |
| 6,042,517 A | 3/2000 | Gunther et al. |
| 6,051,897 A | 4/2000 | Wissler et al. |
| 6,062,350 A | 5/2000 | Spieldiener et al. |
| 6,086,005 A | 7/2000 | Kobayashi et al. |
| 6,209,688 B1 | 4/2001 | Kuwahara |
| 6,209,692 B1 * | 4/2001 | Pels ........................ B60L 7/003 464/82 |
| 6,220,403 B1 | 4/2001 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,466,119 B1 | 10/2002 | Drew |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich |
| 6,659,237 B1 | 12/2003 | Pribonic |
| 6,756,870 B2 | 6/2004 | Kuwahara |
| 6,793,203 B2 | 9/2004 | Heinrichs et al. |
| 6,810,997 B2 | 11/2004 | Schreiber et al. |
| 6,918,469 B1 | 7/2005 | Pribonic et al. |
| 6,962,235 B2 | 11/2005 | Leon |
| 6,973,999 B2 | 12/2005 | Ikuta et al. |
| 7,011,607 B2 | 3/2006 | Kolda et al. |
| 7,014,026 B2 | 3/2006 | Drussel et al. |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner et al. |
| 7,513,334 B2 | 4/2009 | Calver |
| 7,528,514 B2 | 5/2009 | Cruz et al. |
| 7,984,796 B2 | 7/2011 | Pribonic |
| 8,037,978 B1 | 10/2011 | Boren |
| 8,272,476 B2 | 9/2012 | Hartman et al. |
| 8,424,460 B2 | 4/2013 | Lerner et al. |
| 8,490,751 B2 | 7/2013 | Allington et al. |
| 8,511,434 B2 | 8/2013 | Blomberg |
| 8,556,234 B2 | 10/2013 | Hartman et al. |
| 8,567,561 B2 | 10/2013 | Strasser et al. |
| 8,601,951 B2 | 12/2013 | Lerner |
| 8,851,235 B2 | 10/2014 | Allington et al. |
| 9,016,435 B2 | 4/2015 | Allington et al. |
| 9,199,103 B2 | 12/2015 | Hetrich et al. |
| 9,242,128 B2 | 1/2016 | Macy |
| 2002/0162477 A1 | 11/2002 | Palumbo |
| 2002/0179372 A1 | 12/2002 | Schreiber et al. |
| 2003/0116391 A1 | 6/2003 | Desta et al. |
| 2003/0168911 A1 | 9/2003 | Anwar |
| 2003/0211914 A1 | 11/2003 | Perkins et al. |
| 2004/0055836 A1 | 3/2004 | Pribonic et al. |
| 2004/0073346 A1 | 4/2004 | Roelleke |
| 2004/0168855 A1 | 9/2004 | Leon |
| 2004/0191401 A1 | 9/2004 | Bytnar et al. |
| 2005/0051659 A1 | 3/2005 | Wolner et al. |
| 2005/0082410 A1 | 4/2005 | Tanaka et al. |
| 2005/0117258 A1 | 6/2005 | Ohta et al. |
| 2005/0189830 A1 | 9/2005 | Corbin, III et al. |
| 2005/0263356 A1 | 12/2005 | Marzano et al. |
| 2006/0219498 A1 | 10/2006 | Organek et al. |
| 2006/0278478 A1 | 12/2006 | Pribonic et al. |
| 2007/0000741 A1 | 1/2007 | Pribonic et al. |

(56) References Cited

U.S. PATENT DOCUMENTS

| | | | |
|---|---|---|---|
| 2007/0001048 A1 | 1/2007 | Wooster et al. | |
| 2007/0135561 A1 | 6/2007 | Rath et al. | |
| 2007/0228202 A1 | 10/2007 | Scharf et al. | |
| 2007/0228713 A1 | 10/2007 | Takemura | |
| 2007/0256906 A1 | 11/2007 | Jin et al. | |
| 2008/0059028 A1 | 3/2008 | Willerton | |
| 2008/0074223 A1 | 3/2008 | Pribonic | |
| 2008/0087510 A1 | 4/2008 | Pribonic | |
| 2008/0105503 A1 | 5/2008 | Pribonic | |
| 2008/0106420 A1 | 5/2008 | Rohlf | |
| 2008/0135579 A1 | 6/2008 | Bertram et al. | |
| 2009/0026303 A1 | 1/2009 | Schmitz et al. | |
| 2009/0032785 A1 | 2/2009 | Jones | |
| 2009/0084883 A1 | 4/2009 | Casebolt et al. | |
| 2009/0114892 A1 | 5/2009 | Lesko | |
| 2009/0166459 A1 | 7/2009 | Niitsuma et al. | |
| 2009/0178887 A1 | 7/2009 | Reeves et al. | |
| 2009/0211846 A1 | 8/2009 | Taylor | |
| 2009/0319212 A1 | 12/2009 | Cech et al. | |
| 2010/0032255 A1 | 2/2010 | Conti et al. | |
| 2010/0065373 A1 | 3/2010 | Stone et al. | |
| 2010/0112224 A1 | 5/2010 | Lott | |
| 2010/0116922 A1 | 5/2010 | Choate et al. | |
| 2010/0211239 A1 | 8/2010 | Christensen et al. | |
| 2010/0308149 A1* | 12/2010 | Allington | A63B 69/0048 |
| | | | 242/379 |
| 2011/0084158 A1 | 4/2011 | Meillet et al. | |
| 2011/0114907 A1 | 5/2011 | Hartman et al. | |
| 2011/0147125 A1 | 6/2011 | Blomberg | |
| 2011/0166744 A1 | 7/2011 | Lu et al. | |
| 2011/0174914 A1 | 7/2011 | Yang | |
| 2011/0175473 A1 | 7/2011 | Kitabatake et al. | |
| 2011/0240403 A1 | 10/2011 | Meillet | |
| 2011/0297778 A1 | 12/2011 | Meillet et al. | |
| 2012/0055740 A1* | 3/2012 | Allington | A62B 1/10 |
| | | | 182/231 |
| 2012/0118670 A1 | 5/2012 | Olson et al. | |
| 2012/0207001 A1* | 8/2012 | Pittet | G05D 13/24 |
| | | | 368/243 |
| 2012/0312540 A1 | 12/2012 | Lefebvre | |
| 2013/0048422 A1 | 2/2013 | Hartman et al. | |
| 2013/0087433 A1 | 4/2013 | Sejourne | |
| 2013/0118842 A1 | 5/2013 | Lerner | |
| 2013/0186721 A1 | 7/2013 | Bogdanowicz et al. | |
| 2014/0048639 A1 | 2/2014 | Allington et al. | |
| 2014/0110947 A1 | 4/2014 | Mongeau | |
| 2014/0224597 A1 | 8/2014 | Takezawa et al. | |
| 2014/0346909 A1 | 11/2014 | Vogler et al. | |
| 2014/0375158 A1 | 12/2014 | Allington et al. | |
| 2015/0196820 A1 | 7/2015 | Allington et al. | |
| 2015/0231942 A1 | 8/2015 | Trangbaek et al. | |
| 2015/0266454 A1 | 9/2015 | McGowan | |
| 2015/0352380 A1 | 12/2015 | Huang et al. | |
| 2016/0052401 A1 | 2/2016 | McGowan et al. | |
| 2016/0317936 A1 | 11/2016 | Diehl et al. | |
| 2016/0360738 A1 | 12/2016 | Richardson | |
| 2017/0237313 A1 | 8/2017 | Diehl et al. | |
| 2017/0244313 A1 | 8/2017 | Diehl et al. | |
| 2017/0274261 A1 | 9/2017 | Allington et al. | |
| 2017/0328424 A1 | 11/2017 | Allington et al. | |
| 2017/0338728 A1 | 11/2017 | Diehl et al. | |
| 2018/0264296 A1 | 9/2018 | Diehl et al. | |
| 2018/0269767 A1 | 9/2018 | Diehl et al. | |
| 2018/0269768 A1 | 9/2018 | Diehl et al. | |
| 2018/0370484 A1 | 12/2018 | Diehl et al. | |

FOREIGN PATENT DOCUMENTS

| | | |
|---|---|---|
| CN | 202203305 U | 4/2012 |
| CN | 102497085 A | 6/2012 |
| CN | 102627063 A | 8/2012 |
| CN | 103244577 A | 8/2013 |
| CN | 103326538 A | 9/2013 |
| DE | 41 16 160 A1 | 11/1992 |
| DE | 93 00 966 U1 | 3/1993 |
| DE | 10 2005 032 694 A1 | 1/2007 |
| EP | 0 247 818 A2 | 12/1987 |
| EP | 0 460 494 A1 | 12/1991 |
| EP | 0 909 684 A2 | 4/1999 |
| EP | 1 094 240 A2 | 4/2001 |
| EP | 1 401 087 A1 | 3/2004 |
| EP | 1 432 101 A1 | 6/2004 |
| EP | 1 480 320 A1 | 11/2004 |
| EP | 1 564 868 A1 | 8/2005 |
| EP | 1 244 565 B1 | 7/2006 |
| EP | 2 777 771 A2 | 9/2014 |
| GB | 721748 A | 1/1955 |
| GB | 908128 A | 10/1962 |
| GB | 2 340 461 A | 2/2000 |
| GB | 2 352 644 A | 2/2001 |
| GB | 2 352 645 A | 2/2001 |
| GB | 2 352 784 A | 2/2001 |
| GB | 2 357 563 A | 6/2001 |
| JP | 49-23719 A | 3/1974 |
| JP | 49-097163 A | 9/1974 |
| JP | S5148072 A | 4/1976 |
| JP | S53-113528 U | 9/1978 |
| JP | 56-107092 | 8/1981 |
| JP | S56132159 A | 10/1981 |
| JP | 58-25152 U | 2/1983 |
| JP | 60-259278 A | 12/1985 |
| JP | 63-64542 A | 3/1988 |
| JP | 5-296287 A | 11/1993 |
| JP | H05-84347 U | 11/1993 |
| JP | 7-194091 A | 7/1995 |
| JP | 8-252025 A | 10/1996 |
| JP | 10-98868 A | 4/1998 |
| JP | 10-140536 A | 5/1998 |
| JP | H10-178717 A | 6/1998 |
| JP | 10-304799 A | 11/1998 |
| JP | 11-119680 A | 4/1999 |
| JP | 11-189701 A | 7/1999 |
| JP | 11-315662 A | 11/1999 |
| JP | 2000-189530 A | 7/2000 |
| JP | 2000-316272 A | 11/2000 |
| JP | 2000316272 A * | 11/2000 |
| JP | 2001-17041 A | 1/2001 |
| JP | 2004215430 A | 7/2004 |
| JP | 2005-353123 A | 12/2005 |
| JP | 2012-152316 A | 8/2012 |
| JP | 2012520655 A | 9/2012 |
| JP | 2013515574 A | 5/2013 |
| JP | 2018503340 A | 2/2018 |
| RU | 106 462 U1 | 7/2011 |
| WO | 95/16496 A1 | 6/1995 |
| WO | 96/17149 A1 | 6/1996 |
| WO | 98/47215 A1 | 10/1998 |
| WO | 01/38123 A1 | 5/2001 |
| WO | 03/055560 A1 | 7/2003 |
| WO | 2007/060053 A1 | 5/2007 |
| WO | 2008/139127 A1 | 11/2008 |
| WO | 2009/013479 A1 | 1/2009 |
| WO | 2009/047469 A1 | 4/2009 |
| WO | 2009/108040 A1 | 9/2009 |
| WO | 2009/127142 A1 | 10/2009 |
| WO | 2010/104405 A2 | 9/2010 |

OTHER PUBLICATIONS

Extended European Search Report, dated Mar. 29, 2018, for European Application No. 15834380.6-1201, 12 pages.

Extended European Search Report, dated Apr. 6, 2018, for European Application No. 15864540.8-1201, 26 pages.

Final Office Action, dated Feb. 28, 2017, for U.S. Appl. No. 14/464,255, Allington et al., "Braking Mechanisms," 10 pages.

International Search Report and Written Opinion, dated Apr. 1, 2016, for International Application No. PCT/NZ2015/050206, 9 pages.

International Search Report and Written Opinion, dated Feb. 13, 2009, for International Application No. PCT/US2008/087863, 15 pages.

(56) References Cited

OTHER PUBLICATIONS

International Search Report and Written Opinion, dated Feb. 23, 2011, for International Application No. PCT/NZ2010/000011, 10 pages.
International Search Report and Written Opinion, dated Feb. 24, 2016, for International Application No. PCT/NZ2015/050207, 10 pages.
International Search Report and Written Opinion, dated Jan. 29, 2016, for International Application No. PCT/NZ2015/050208, 11 pages.
International Search Report and Written Opinion, dated Mar. 11, 2015, for International Application No. PCT/NZ2014/000245, 8 pages.
International Search Report and Written Opinion, dated Mar. 18, 2016, for International Application No. PCT/NZ2015/050209, 14 pages.
International Search Report and Written Opinion, dated Mar. 29, 2016, for International Application No. PCT/NZ2015/050205, 10 pages.
International Search Report and Written Opinion, dated Nov. 11, 2015, for International Application No. PCT/NZ2015/050114, 10 pages.
International Search Report and Written Opinion, dated Nov. 18, 2015, for International Application No. PCT/NZ2015/050113, 9 pages.
International Search Report and Written Opinion, dated Oct. 26, 2015, for International Application No. PCT/NZ2015/050115, 10 pages.
MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.
North Safety Products Europe B.V., "Climbing Wall Descender: FP2/5**GDD," *Climbing Wall Descent Controllers Instruction Manual v3*, Aug. 18, 2008, 20 pages.
Notice of Allowance, dated Jul. 21, 2014, for U.S. Appl. No. 13/255,625, Allington et al., "Braking Mechanisms," 11 pages.
Office Action, dated Aug. 22, 2017, for U.S. Appl. No. 14/464,255, Allington et al., "Braking Mechanisms," 5 pages.
Office Action, dated Feb. 20, 2018, for U.S. Appl. No. 14/464,255, Allington et al., "Braking Mechanisms," 15 pages.
Office Action, dated Jan. 17, 2018, for U.S. Appl. No. 15/586,111, Allington et al., "Braking Mechanisms," 15 pages.
Office Action, dated Jan. 9, 2014, for U.S. Appl. No. 13/255,625, Allington et al., "Braking Mechanisms," 9 pages.
Office Action, dated Jul. 25, 2016, for U.S. Appl. No. 14/464,255, Allington et al., "Braking Mechanisms," 10 pages.
Park et al., "Torque analysis and measurements of a permanent magnet type Eddy current brake with a Halbach magnet array based on analytical magnetic field calculations," Journal of Applied Physics 115(17): 17E707, 2014. (3 pages).
Trublue Auto Belays, Model TB150-12C Operator Manual, Jun. 20, 2013, 37 pages.

* cited by examiner

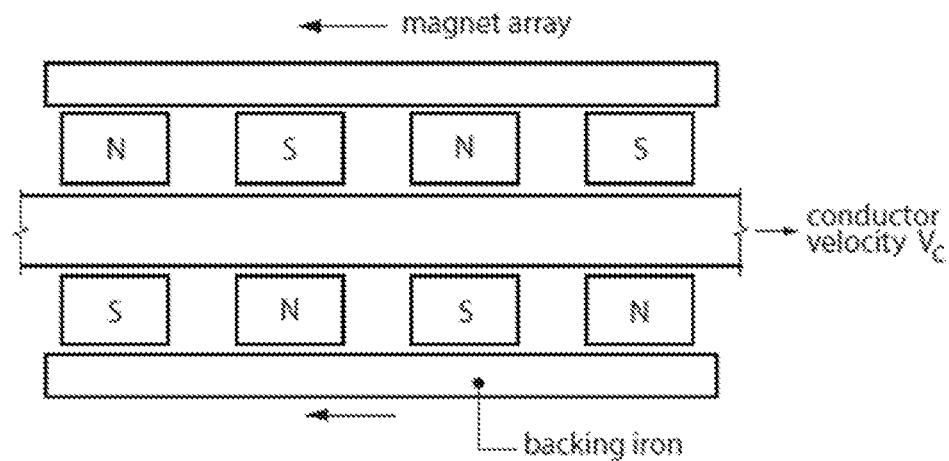
FIGURE 1 – PRIOR ART
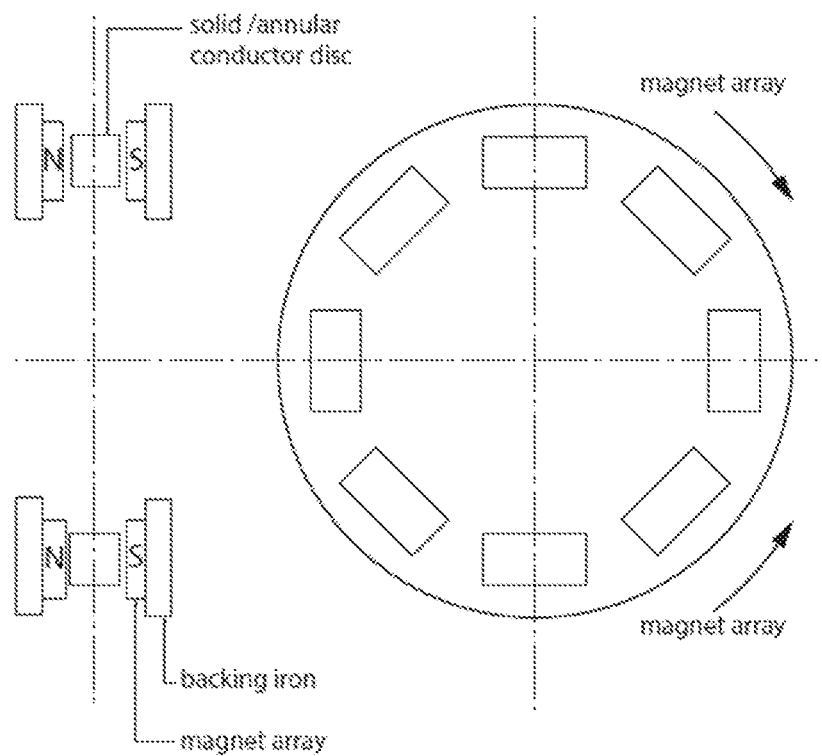
FIGURE 2 – PRIOR ART

EDDY CURRENT BRAKE CONFIGURATIONS

BACKGROUND

Technical Field

Described herein are eddy current brake configurations and methods of use. More specifically, eddy current brake configurations are described that utilize varying kinematic relationships between the parts.

Description of the Related Art

The applicant's co-pending and granted patents in the field of eddy current related devices include U.S. Pat. Nos. 8,851,235, 8,490,751, NZ619034, NZ627617, NZ627619, NZ627633, NZ627630 and other equivalents all incorporated herein by reference.

Eddy current brake configurations work on the principle that an electrically conductive element moving relative to a magnetic field induces eddy current forces that act to resist relative movement between the magnetic field and electrical conductor—i.e. they are retarding forces.

Eddy current brake configurations can be grouped into categories by considering the number of degrees of freedom (DOF) employed by the brake and whether these are linear (L) or rotational (R) degrees of freedom. A 1 DOF rotational configuration may thus be labelled '1R', a 2 DOF linear configuration may be labelled '2L'.

A 1L, single linear DOF configuration may take the form of a linear brake configuration that can be realized with an electrical conductor passing an array of magnets (1L) as shown in FIG. 1. An alternative 1L arrangement may be an array of magnets passing an electrical conductor like that used in art roller coaster brakes. A 1R: single rotational DOF can be realized with a plain disc brake such as that shown in FIG. 2.

A 1R1L: one linear and one rotational DOF may be realized for example using the plunger brake described in the applicant's co-pending patent application NZ619034 that has one linear DOF along the brake axis and one rotational DOF about the brake axis. This 1R1L DOF provides the possibility for torque regulation by varying the axial displacement of the electrical conductor with respect to the magnetic array whilst maintaining a continuous electrical conductor.

A further example is the 2R DOF brake described in the applicant's co-pending patent published as U.S. Pat. Nos. 8,851,235 and 8,490,751. The disc brake configuration with integrated kinematic control described in these patents can be categorized as a 2R brake as the kinematic motion of the arms occurs around an axis radially translated or offset from the primary brake axis. The variable overlap of the arms (electrical conductor) with the flux from the magnetic array results in a variable torque brake. The interaction between the centripetal forces, eddy current drag forces and spring bias forces can be configured to give controlled speed regulation independent of input torque.

The devices described in the art may be useful, for example due to their providing frictionless methods of controlling movement. However, other methods of altering eddy current interactions may also be achieved using different configurations or at least provide the public with a choice.

Further aspects and advantages of the eddy current brake configurations and methods of use should become apparent from the ensuing description that is given by way of example only.

BRIEF SUMMARY

Described herein are eddy current brake configurations and methods of use, particularly configurations that have a kinematic relationship with at least two rotational degrees of freedom used to tune activation and operation of the brake or apparatus in which the brake is located.

In a first aspect, there is provided an eddy current brake configuration comprising:
(a) a magnetic field; and
(b) an electrical conductor;
wherein the magnetic field and electrical conductor move relative to each other and interact thereby inducing eddy current drag forces; and
wherein the eddy current brake is configured to have at least two rotational degrees of freedom, where a first primary axis of rotation is angularly translated relative to at least one secondary or control axis of rotation and wherein the braking action is applied to the primary axis and the at least one secondary axis is used to modulate of the braking action.

In a second aspect, there is provided a method of generating an eddy current drag force by the steps of:
(a) selecting an eddy current brake configuration substantially as described above;
(b) applying a driving force to cause varying relative movement between the magnetic field and the at least one electrical conductor; and
(c) by causing movement, making the at least one electrical conductor and the magnetic field interact thereby inducing eddy current drag forces and acting to resist relative motion between the magnetic field and the at least one electrical conductor.

Advantages of the above described eddy current brake configuration and method of use include the ability to tune a brake response to a degree that may be difficult to achieve via single degree of freedom configurations. Greater tuning allows for example the ability to brake a great range of torque forces and allows the ability to prevent on/off braking—braking can be of a controlled and/or near constant rate for a range of different input conditions.

BRIEF DESCRIPTION OF THE SEVERAL VIEWS OF THE DRAWINGS

Further aspects of the eddy current brake configuration and methods of use will become apparent from the following description that is given by way of example only and with reference to the accompanying drawings in which:

FIG. 1 illustrates a prior art single linear degree of freedom eddy current brake configuration;

FIG. 2 illustrates a prior art single rotational degree of freedom eddy current brake configuration;

DETAILED DESCRIPTION

Figure 3:
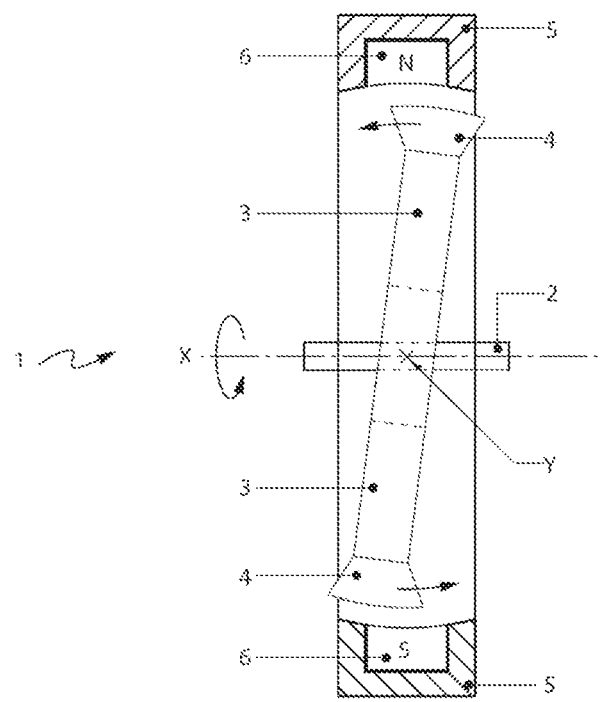
FIG. 3 illustrates an embodiment of a double rotational degree of freedom eddy current brake configuration with the rotation axes being angularly translated to each other, either intersecting, or not.

As noted above, described herein are eddy current brake configurations and methods of use, particularly configurations that have a kinematic relationship with at least two rotational degrees of freedom (2R DOF) used to tune operation of the brake or apparatus in which the brake is located.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'link' and grammatical variations thereof refer to both direct linkage as well as indirect linkage such as via another member.

In a first aspect, there is provided an eddy current brake configuration comprising:
(a) a magnetic field; and
(b) an electrical conductor;
wherein the magnetic field and electrical conductor move relative to each other and interact thereby inducing eddy current drag forces; and
wherein the eddy current brake is configured to have at least two rotational degrees of freedom, where a first primary axis of rotation is angularly translated relative to at least one secondary or control axis of rotation and wherein the braking action is applied to the primary axis and the at least one secondary axis is used to modulate of the braking action.

The inventors have identified that a 2R DOF configuration may be useful to tune an eddy current brake configuration. 2R DOF may offer more range and opportunity to vary the brake dynamics than for example a 1R or 1L configuration. The second degree of freedom noted above may introduce kinematic control regulation to the brake, this being a key improvement over the art. Kinematic control may for example allow a controlled output braking response irrespective of input motive force on the braking mechanism. A further advantage is avoidance of hysteresis like on/off switching of a brake response avoiding fluctuations in braking undesirable in many applications where a smooth brake effect is desirable or even essential. Other advantages are described further below.

For the discussion below, one arrangement of electrical conductor(s) and magnets or magnetic field will be described. This arrangement should not be seen as limiting as it should be appreciated that the electrical conductor(s) and magnet(s)/magnetic field may be swapped and still achieve the same result of eddy current brake force generation.

Further, for the discussion below, reference may be made to a single electrical conductor or single magnetic field however, this should not be seen as limiting since multiple electrical conductors or multiple magnetic fields may be used.

The eddy current brake may be configured to have a central point of rotation or pivot. In one embodiment, the central point of rotation may be a first rotating shaft and an electrical conductor may be linked to, and rotate with, the shaft. A shaft may not be essential as the electrical conductor may be supported on the outside of a casing and therefore need no central support. The electrical conductor may be located at least partially within a magnetic field when braking is to occur. Relative movement between the electrical conductor and the magnetic field then induces eddy current braking forces acting to resist movement of the electrical conductor and in turn acts to resist movement of the shaft. The term 'shaft' is used in a wide sense—shafts may be cylindrical volumes but may instead be tubes, square, oblong or other shaped elements.

As noted above, the second axis of rotation is in a different plane to that of the first axis of rotation. In one embodiment, the second axis of rotation may be at an angle generally orthogonal to the first degree of freedom axis of rotation although non-orthogonal angles may also be possible. An orthogonal second axis of rotation may assist with system stability and avoid oscillating forces.

The first axis of rotation and at least one second axis of rotation may intersect. For ease of description, reference may be made to the axes intersecting in this specification however this should not be seen as limiting as non-intersecting axes but with angular translation may also be achieved.

In one specific embodiment, the shaft may have a collar, and either one section of the collar, multiple sections of the collar or the whole collar may be an electrical conductor.

The collar may rotate about a second rotation axis mounted on or about the shaft itself. In this embodiment, collar rotation also rotates the electrical conductor. The shaft on which a collar and electrical conductor is mounted may itself be flexible or instead may incorporate a flexible coupling to allow secondary axis rotation of the collar and electrical conductor thereon.

Alternatively, the electrical conductor may rotate about an axis or axes mounted on the collar and, when shaft or a first rotation occurs; at least part of the conductive member(s) rotate outward from the plane of rotation of the collar about a second rotation axis or axes. In this embodiment, the collar may include discrete sections with their own axis of rotation mounted about the collar circumference.

The secondary axis of rotation may be fixed. Alternatively, the secondary axis of rotation may move as prescribed by the kinematic relationship. In addition, the secondary axis of rotation may be an axis that is not physically generated by a pin or shaft, but may rather be an axis of effective rotation resulting from the geometry and kinematics of a movement and restraint mechanism. Non-limiting examples of ways this configuration might be achieved may include by using: a slider in a curved groove, a '4 bar linkage', a flexible leaf spring, and combinations thereof.

The magnetic field within which the electrical conductor moves may be formed by one or more magnets situated on a housing or external element. The housing or external element may define a cavity inside which the shaft and electrical conductor move.

In an alternative embodiment, the electrical conductor may be linked to the shaft via a line (flexible or rigid) and centrifugal forces acting on the electrical conductor member(s) caused by rotation of the shaft urging the electrical conductor to axially rotate away from the shaft. In this embodiment a bias means may be used to tune the axial rate of movement of the electrical conductor away from the shaft axis. In one embodiment, the bias may be a spring.

In a further embodiment, the eddy current brake may be configured to have a shaft that rotates about a first axis of rotation and a collar coupled to the shaft that rotates about the shaft axis of rotation. The collar may comprise a rebate or rebates about the collar circumference with magnets inside the rebate defining at least one magnetic field between the magnets, the magnetic field or fields moving about the shaft axis of rotation. One or more electrical conductors may move rotationally into or out of the magnetic fields about a second axis of rotation mounted on the collar circumference.

In the above aspect, one embodiment may take the configuration of an epicyclic gearbox with a 2R DOF configuration. The gearbox may comprise a sun (e.g., a shaft) with planets (gears, balls, disc etc.) rotating about the sun and with rotation governed by a kinematic and rotationally coupled relationship, the parts maintained in alignment via an annulus. The electrical conductor in this embodiment may be the planets or an attachment thereof that rotate through a magnetic field generated by a magnet array located on either side of the planets so that the magnetic field passes orthogonally across the planets. The first axis of rotation may be rotation of either the sun (shaft) or rotation of the annulus. The second axis or axes of rotation may be rotation of the planets. As movement occurs, there may be a retarding torque induced by movement of the planets around the sun axis and additionally retarding torque induced by the planets rotating about their own secondary rotation axis. The sun may drive the planets via a gear arrangement, by a traction drive, via belts, via friction between the sun and planets and other driving configurations. A bearing can also be thought of as an epicyclic gearbox. In this case, a housing acts as an overall carrier, the balls or rollers of the bearing act as the planets, an outer ring acts as the annulus and an inner ring acts as the sun. An eddy current brake can be configured to act on the inner ring (1R) and/or on the planets (2R).

In a second aspect, there is provided a method of generating an eddy current drag force by the steps of:
(a) selecting an eddy current brake configuration substantially as described above;
(b) applying a driving force to cause varying relative movement between the magnetic field and the at least one electrical conductor; and
(c) by causing movement, making the at least one electrical conductor and magnetic field interact thereby inducing eddy current drag forces and acting to resist relative motion between the magnetic field and the at least one electrical conductor.

In one embodiment, an autobelay or self-retracting lifeline (SRL) embodiment may use the eddy current braking configurations described above. The shaft or first rotating element may have a spool of line thereon and when pay out of line occurs (for example from an object falling); the shaft rotates imparting secondary rotation movement on the electrical conductor. Electrical conductor movement results in eddy current drag forces occurring that act to slow movement of the electrical conductor thus slowing movement of the shaft or first rotating element. Slowing the shaft then slows pay out of the line thereby braking the fall of the object. This example should not be seen as limiting since the eddy current brake configurations described herein may be used for a wide variety of other applications, non-limiting examples including speed control of:
  a rotor in a rotary turbine;
  exercise equipment e.g. rowing machines, epicyclic trainers;
  roller-coasters and other amusement rides;
  Elevator and escalator systems;
  evacuation descenders and fire escape devices;
  conveyer systems:
  rotary drives in factory production facilities;
  materials handling devices such as conveyer belts or a braking device in a chute;
  dynamic display signage to control the rate of change of rotating signs;
  roadside safety systems e.g. the eddy current brake may be connected in a system to provide crash attenuation though the dissipation of energy via the brake;
  seat belts in vehicles;
  zip lines;
  braking mechanisms for trolleys and carriages.

Advantages of the above described eddy current brake configuration and methods of use include the ability to tune a brake response to a degree that may be difficult to achieve via single degree of freedom configurations. Greater tuning allows for example the ability to brake a greater range of torque forces and allows the ability to prevent on/off braking—braking can be of a controlled and/or near constant rate for a range of different input conditions.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

WORKING EXAMPLES

The above described eddy current brake configuration and methods of use are now described by reference to specific examples.

Example 1

FIG. 3 illustrates how an art 1R eddy current brake configuration may be modified to have a 2R configuration.

The eddy current brake shown generally by arrow 1 has a shaft 2 rotating about axis X. The shaft includes a collar 3 that is linked to the shaft 2. Electrical conductor members 4 are located at either end of the collar 3. The collar 3 is free to rotate about a second axis marked by arrow Y located on or about the center of the collar 3.

During eddy current braking, the shaft 2 and collar 3 are located within a magnetic field formed by a housing 5 about the shaft 2 and collar 3, the housing 5 including magnets 6 that generate the magnetic field.

The electrical conductor members 4 are able to rotationally translate via the second axis of rotation Y into or out of the magnetic field. FIG. 3 demonstrates the electrical conductor members 4 partially outside the magnetic field generated by the magnets 6.

Relative movement between the electrical conductor members 4 (from both first and second degrees of rotation) and the magnetic field then induce eddy current braking forces resisting movement of the electrical conductor members 4 and in turn resisting movement of the shaft 2.

As can be seen in FIG. 3, the second axis of rotation Y is at an angle generally orthogonal to the first axis of rotation X.

The shaft 2 may itself be flexible to allow second axis rotation Y, or instead, the shaft 2 may incorporate a flexible coupling (not shown) to allow second axis rotation Y of the collar 3 and electrical conductor members 4.

Note that additional force modifying and generating means may also be used such as springs although, for clarity, these additional means are not shown.

Example 2

Figure 4:
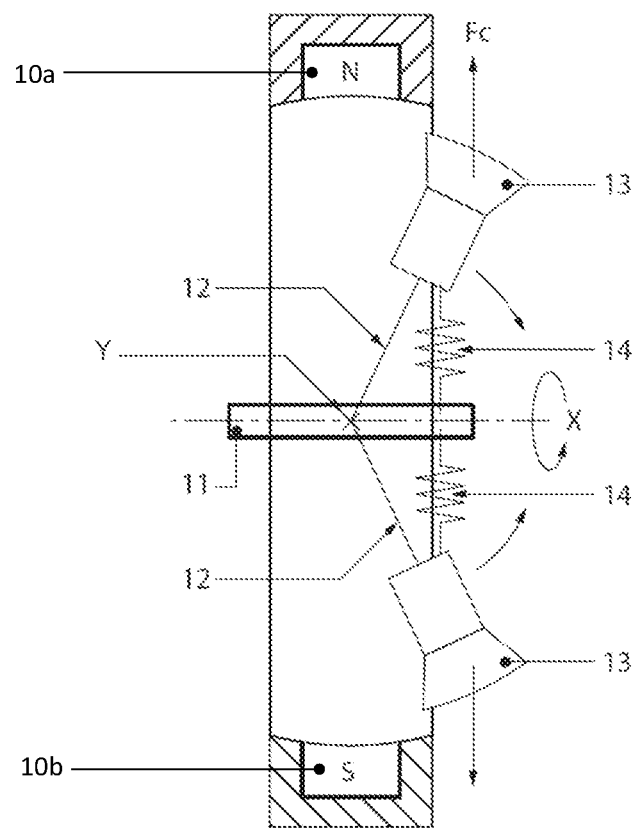
FIG. 4 illustrates an alternative embodiment of a double rotational degree of freedom eddy current brake configuration with the rotation axes being angularly translated to each other, either intersecting, or not.

FIG. 4 illustrates an alternative way to achieve a second rotation axis Y for the electrical conductors to rotate about in a 2R configuration. In this embodiment the shaft 11 rotates about first rotation axis X within a magnetic field generated by magnets 10a, 10b located on a housing 10. The electrical conductor members 13 are linked to the shaft 11 via links 12 and a spring 14. The attachment point of the link 12 to the shaft 11 defines a second rotation axis Y. When no first axis X rotation occurs, the electrical conductor members 13 are biased by the spring 14 to a point outside the magnetic field. When first axis X rotation occurs, the electrical conductor members 13 are urged by centrifugal forces to rotate via second axis Y against the bias of the spring 14, into the magnetic field thereby inducing an eddy current brake forces.

Again, note that additional force modifying and generating means may be also be used such as springs although, for clarity, these additional means are not shown.

Example 3

Figure 5:
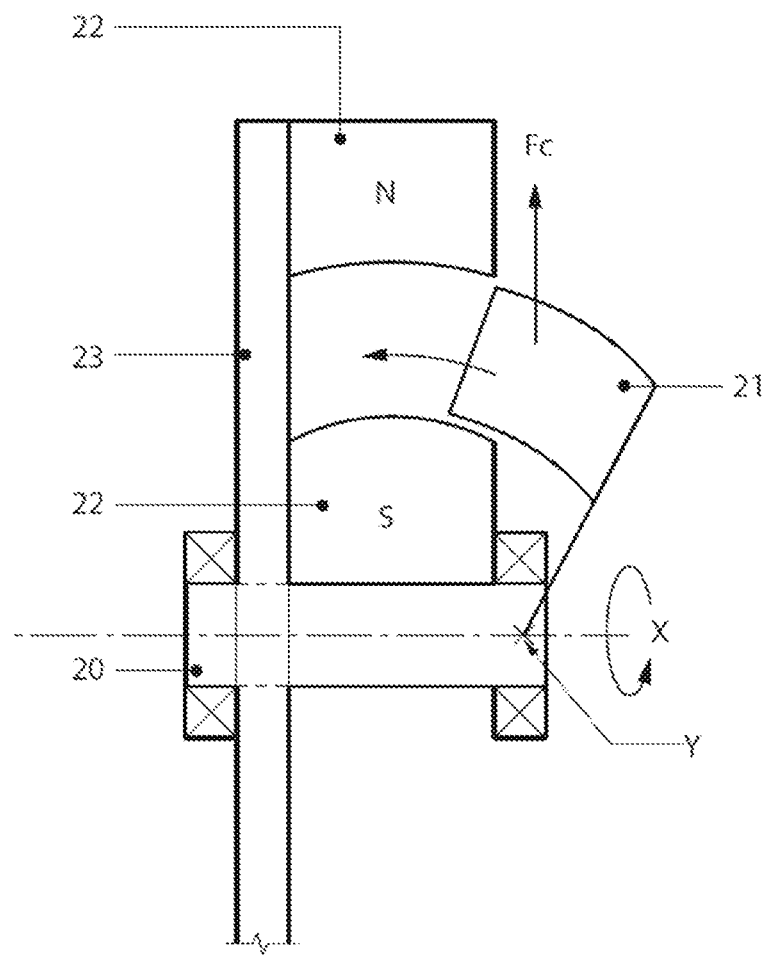
FIG. 5 illustrates a further alternative double rotational degree of freedom eddy current brake configuration with the rotation axes being angularly translated to each other, either intersecting, or not.

FIG. 5 demonstrates a further embodiment, this time achieving a segmented or petal 2R configuration.

In this embodiment, the shaft 20 rotates about a first rotation axis X and an electrical conductor member 21 rotates about a second rotation axis Y. In this embodiment, magnets 22 are located on a collar 23 located about the shaft 20. When rotation of the shaft 20 occurs about the first rotation axis X, centrifugal forces urge the electrical conductor member 21 to rotate about second rotation axis Y. Second axis Y rotation causes the electrical conductor member 21 to enter the magnetic field and thereby inducing an eddy current brake force.

As per Example 1 and 2, note that additional force modifying and generating means may be also be used such as springs although, for clarity, these additional means are not shown.

Aspects of the eddy current brake configurations and methods of use have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An eddy current brake, comprising:
   a shaft with a first rotation axis; and
   two opposed electrical conductor members, each electrical conductor member being linked to the shaft via a respective link and a respective spring, the electrical conductor members, links and springs rotating with the shaft about the first rotation axis when the shaft rotates about the first rotation axis;
   wherein the electrical conductor members interact with an adjacent magnetic field and, when relative movement between the electrical conductor members and magnetic field occurs, eddy current drag forces are induced slowing relative movement between the electrical conductor members and magnetic field;
   wherein a respective attachment point of each link to the shaft defines a second rotation axis for each respective link, wherein the second rotation axis is not parallel to the first rotation axis;
   wherein, when no shaft rotation about the first rotation axis occurs, each of the electrical conductor members is biased by the respective spring to rotate about the respective second rotation axis away from the magnetic field, and, when shaft rotation about the first rotation axis occurs, each of the electrical conductor members is urged by centrifugal forces to rotate about the respective second rotation axis against the bias of the respective spring toward the magnetic field thereby causing an eddy current brake force to be induced.

2. The eddy current brake as claimed in claim 1, wherein at least one of the electrical conductor members is located at least partially within the magnetic field when the shaft is not rotating about the first rotation axis.

3. The eddy current brake as claimed in claim 1, wherein at least one of the electrical conductor members is located outside the magnetic field when the shaft is not rotating about the first rotation axis.

4. An autobelay device incorporating the eddy current brake as claimed in claim 1.

5. A self-retracting lifeline (SRL) device incorporating the eddy current brake as claimed in claim 1.

6. The eddy current brake as claimed in claim 1, wherein the first axis of rotation is orthogonal to each second axis of rotation.

7. The eddy current brake as claimed in claim 1, wherein the first axis of rotation and the second axes of rotation intersect.

8. The eddy current brake as claimed in claim 1, wherein a first one of the second axes of rotation is coaxial with the other of the second axes of rotation.

9. The eddy current brake as claimed in claim 1, wherein each of the electrical conductor members is located at least partially within the magnetic field when the shaft is not rotating about the first rotation axis.

10. The eddy current brake as claimed in claim 1, wherein each of the electrical conductor members is located outside the magnetic field when the shaft is not rotating about the first rotation axis.

11. The eddy current brake as claimed in claim 1, wherein the magnetic field within which the electrical conductor moves is formed by one or more magnets situated on a housing or external element.

12. The eddy current brake as claimed in claim 11, wherein the housing or external element defines a cavity inside which the shaft and electrical conductors move.

\* \* \* \* \*